United States Patent
Trachewsky et al.

(10) Patent No.: US 7,330,501 B2
(45) Date of Patent: Feb. 12, 2008

(54) ORTHOGONAL NORMALIZATION FOR A RADIO FREQUENCY INTEGRATED CIRCUIT

(75) Inventors: Jason A. Trachewsky, Menlo Park, CA (US); Alan Corry, Santa Clara, CA (US); Christopher J. Hansen, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 749 days.

(21) Appl. No.: 10/757,926

(22) Filed: Jan. 15, 2004

(65) Prior Publication Data

US 2005/0157778 A1     Jul. 21, 2005

(51) Int. Cl.
*H04B 1/38* (2006.01)

(52) U.S. Cl. ...................................... 375/219

(58) Field of Classification Search ................ 375/219, 375/221, 343; 370/276, 273, 297; 455/73
See application file for complete search history.

(56) References Cited

U.S. PATENT DOCUMENTS

| | | | | |
|---|---|---|---|---|
| 5,249,203 A | * | 9/1993 | Loper | 375/344 |
| 5,848,099 A | * | 12/1998 | Benner | 375/226 |
| 6,009,317 A | * | 12/1999 | Wynn | 455/296 |
| 6,330,290 B1 | * | 12/2001 | Glas | 375/324 |
| 2002/0097812 A1 | * | 7/2002 | Wiss | 375/316 |
| 2003/0206603 A1 | * | 11/2003 | Husted | 375/324 |

* cited by examiner

*Primary Examiner*—David C Payne
*Assistant Examiner*—Leon Flores
(74) *Attorney, Agent, or Firm*—Garlick Harrison & Markison; Timothy W. Markison; Kevin L. Smith

(57) ABSTRACT

A radio frequency integrated circuit includes a transmitter section, and a receiver section. The receiver section includes a low noise amplifier, down conversion module, an orthogonal-normalizing module, and a baseband processor. The low noise amplifier is operably coupled to amplify the inbound RF signals to produce amplified inbound signals. The down conversion module is operably coupled to convert the amplified inbound RF signals into baseband in-phase components and baseband quadrature components. The orthogonal normalizing module is operably coupled to obtain a $1^{st}$ and $2^{nd}$ coefficients that are based on at least one of power of the baseband in-phase components, power of the baseband quadrature components, and/or cross-correlation between the baseband in-phase component and baseband quadrature components. The orthogonal normalizing module then normalizes an orthogonal relationship between the in-phase components and quadrature components based on the $1^{st}$ and $2^{nd}$ coefficients to produce normalized in-phase components and normalized quadrature components.

16 Claims, 12 Drawing Sheets orthogonal normalizing module 112 orthogonal normalizing module 112 multiplier 120, 122, or 126 orthogonal normalizing
module 112 orthogonal normalizing module 112 orthogonal normalizing module 112

ORTHOGONAL NORMALIZATION FOR A RADIO FREQUENCY INTEGRATED CIRCUIT

CROSS REFERENCE TO RELATED PATENTS

This patent is claiming priority under 35 USC § 120 to patent application entitled Digital Estimation and Correction of I/Q Mismatches in Direct Conversion Receivers, having a Ser. No. 10/172,978, and a filing date of Jun. 18, 2002.

BACKGROUND OF THE INVENTION

1. Technical Field of the Invention

This invention relates generally to wireless communication systems and more particularly to direct conversion radio frequency receivers.

2. Description of the Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one intermediate frequency stage for direct conversion, and a power amplifier. The data modulation stage converts raw data into complex baseband signals (i.e., in-phase signal components and quadrature signal components) in accordance with a particular wireless communication standard. The intermediate frequency stage mixes the complex baseband signals with a local oscillation to produce RF signals. The power amplifier amplifies the RF signals prior to transmission via an antenna.

As is also known, the receiver is coupled to the antenna and includes a low noise amplifier, one intermediate frequency stage for direct conversion, a filtering stage, and a data recovery stage. The low noise amplifier receives inbound RF signals via the antenna and amplifies them. The intermediate frequency stage mix the amplified RF signals with a local oscillation having an in-phase component and a quadrature component to convert the amplified RF signal into complex baseband signals. The filtering stage filters the complex baseband signals to attenuate unwanted out of band signals to produce filtered signals. The data recovery stage recovers raw data from the filtered signals in accordance with the particular wireless communication standard.

Ideally, the complex baseband signals produced by the direct conversion receiver are orthogonal (i.e., signals of the same magnitude but phase shifted by 90 degrees). However, due to component limitations of the receiver, ideal complex signals are not achieved. The actual complex signals include an I-Q mismatch, where the magnitudes of the I and Q signal components may not be identical and/or may be shifted by more or less than 90 degrees. Such I-Q mismatches can cause errors in the recapturing of data.

Therefore, a need exists for a method and apparatus for minimizing I-Q mismatches in direct conversion receivers.

BRIEF SUMMARY OF THE INVENTION

The orthogonal normalization for a radio frequency integrated circuit in accordance with the present invention substantially meets these needs and others. In one embodiment, a radio frequency integrated circuit includes a transmitter section, and a receiver section. The transmitter section is operably coupled to convert outbound baseband signals into outbound radio frequency signals. The receiver section is operably coupled to convert inbound radio frequency signals into inbound baseband signals and includes a low noise amplifier, down conversion module, an orthogonal-normalizing module, and a baseband processor. The low noise amplifier is operably coupled to amplify the inbound RF signals to produce amplified inbound signals. The down conversion module is operably coupled to convert the amplified inbound RF signals into baseband in-phase components and baseband quadrature components. The orthogonal normalizing module is operably coupled to obtain a $1^{st}$ coefficient that is based on at least one of power of the baseband in-phase components, power of the baseband quadrature components, and/or cross-correlation between the baseband in-phase component and baseband quadrature components. The orthogonal normalizing module then obtains a $2^{nd}$ coefficient that is based on the power of the baseband in-phase component, the power of the baseband quadrature component and/or the cross-correlation between the baseband in-phase and quadrature components. The orthogonal normalizing module then normalizes an orthogonal relationship between the in-phase components and quadrature components based on the $1^{st}$ and $2^{nd}$ coefficients to produce normalized in-phase components and normalized quadrature components. The baseband processor is operably coupled to recapture data from the normalized in-phase components and normalized quadrature components. With such an orthogonal normalizing process, the relationship between the baseband in-phase components and baseband quadrature components are normalized to the desired orthogonal relationship such that the accuracy of recapturing data is improved.

In another embodiment, a radio frequency integrated circuit includes a transmitter section and a receiver section. The transmitter section is operably coupled to convert outbound baseband signals into outbound radio frequency signals. The receiver section is operably coupled to convert inbound radio frequency signals into inbound data and includes a low noise amplifier, a down conversion module, an orthogonal normalizing module, and a baseband processor. The orthogonal normalizing module includes an in-phase power module, a quadrature power module, a cross-correlation power module, and a normalizing module. The low noise amplifier is operably coupled to amplify the inbound RF signals to produce amplified inbound RF signals. The down conversion module is operably coupled to convert the amplified inbound RF signals into baseband in-phase components and quadrature components. The in-phase power module of the orthogonal normalizing module is operably coupled to determine the power of the baseband in-phase components. The quadrature power module is operably coupled to determine the power of the quadrature components. The cross-correlation power module is operably coupled to determine a cross-correlation power based on the in-phase and quadrature components. The normalizing module is operably coupled to normalize the baseband in-phase components and baseband quadrature components based on the power of the in-phase components, the power of the baseband components and the cross-correlation power. The baseband processor is operably coupled to recapture data from the normalized in-phase and quadrature component.

In another embodiment, a radio frequency integrated circuit includes a receiver section and a transmitter section. The receiver section is operably coupled to convert inbound radio frequency signals into inbound baseband signals. The transmitter section is operably coupled to convert outbound data into outbound RF signals and includes a baseband processor, an orthogonal normalizing module, an up-conversion module, and a power amplifier. The baseband processor is operably coupled to convert the outbound data into baseband in-phase components and baseband quadrature components. The orthogonal normalizing module is operably coupled to obtain a $1^{st}$ coefficient that is based on a gain imbalance and/or a phase imbalance between the in-phase and quadrature components. The normalizing module then obtains a $2^{nd}$ coefficient that is also based on the gain imbalance and/or phase and balance of the in-phase and quadrature components. The orthogonal normalizing module then normalizes an orthogonal relationship between the baseband in-phase component and the baseband quadrature components based on the $1^{st}$ and $2^{nd}$ coefficients. The up-conversion module is operably coupled to convert the normalized in-phase and quadrature components into RF signals. The power amplifier is operably coupled to amplify the RF signals to produce the outbound RF signals.

In yet another embodiment, a method for orthogonal normalization of a radio frequency integrated circuit begins by determining a phase imbalance and a gain imbalance of a transmitter section within the radio frequency integrated circuit. The process then continues by normalizing baseband in-phase components and baseband quadrature components of the transmitter section based on the phase imbalance and the gain imbalance. The processing then continues by coupling the transmitter section to a receiver section of the radio frequency integrated circuit in a loop back configuration. The processing then continues by providing a test signal from the transmitter section to the receiver section. The processing then continues by determining power of baseband in-phase components, power of baseband quadrature components and cross-correlation between the baseband in-phase components and baseband quadrature components of the receiver section while processing the test signal. The processing then continues by normalizing the in-phase components and baseband components of the receiver section based on the power of the baseband in-phase components, the power of the baseband quadrature components, and the cross-correlation between the baseband in-phase components and the baseband quadrature components.

DETAILED DESCRIPTION OF THE INVENTION

Figure 1:
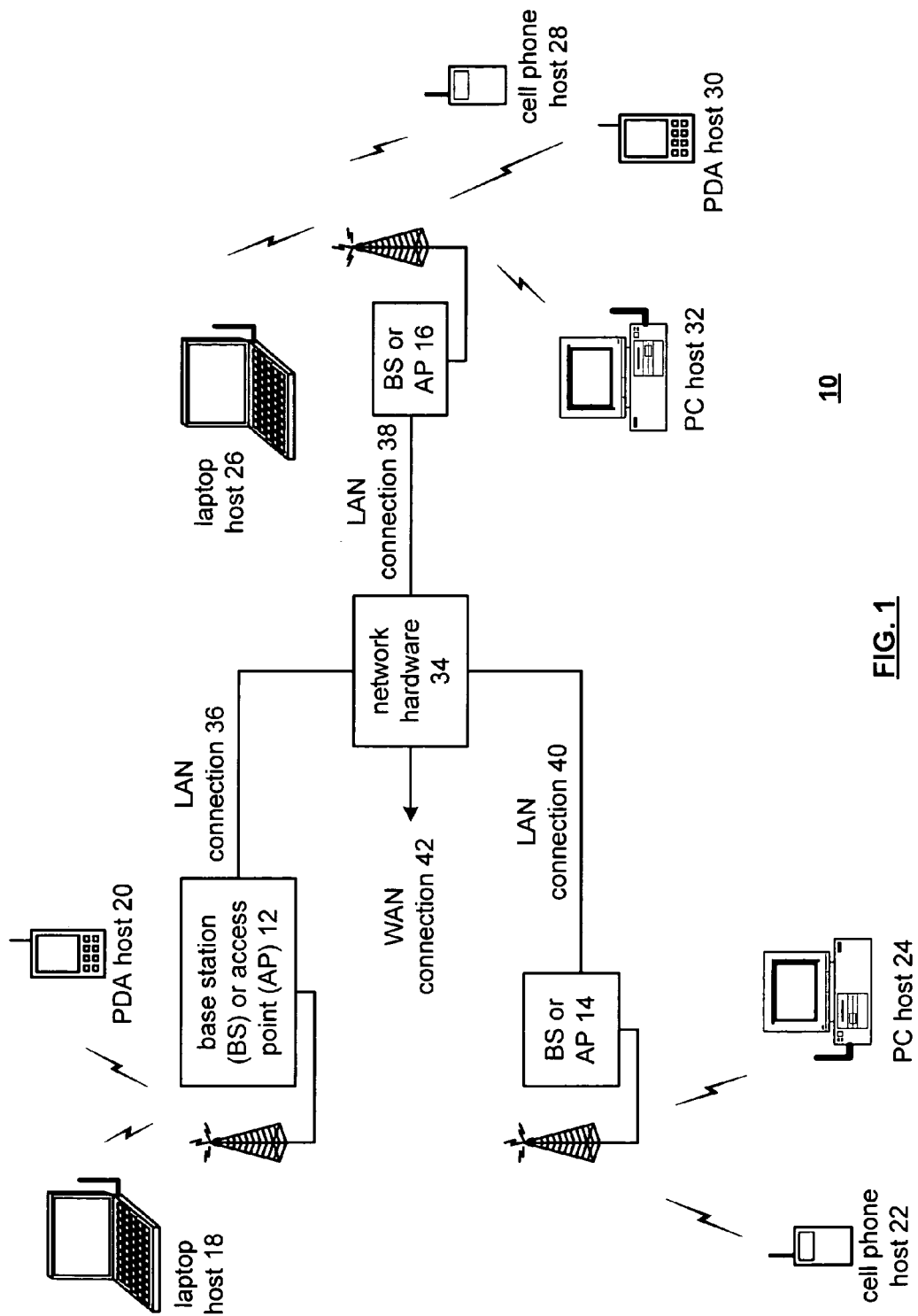
FIG. 1 is a schematic block diagram of a wireless communication system in accordance with the present invention.

FIG. 1 is a schematic block diagram illustrating a communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

The base stations or access points 12-16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio. The radio includes a highly linear amplifier and/or programmable multi-stage amplifier as disclosed herein to enhance performance, reduce costs, reduce size, and/or enhance broadband applications.

Figure 2:
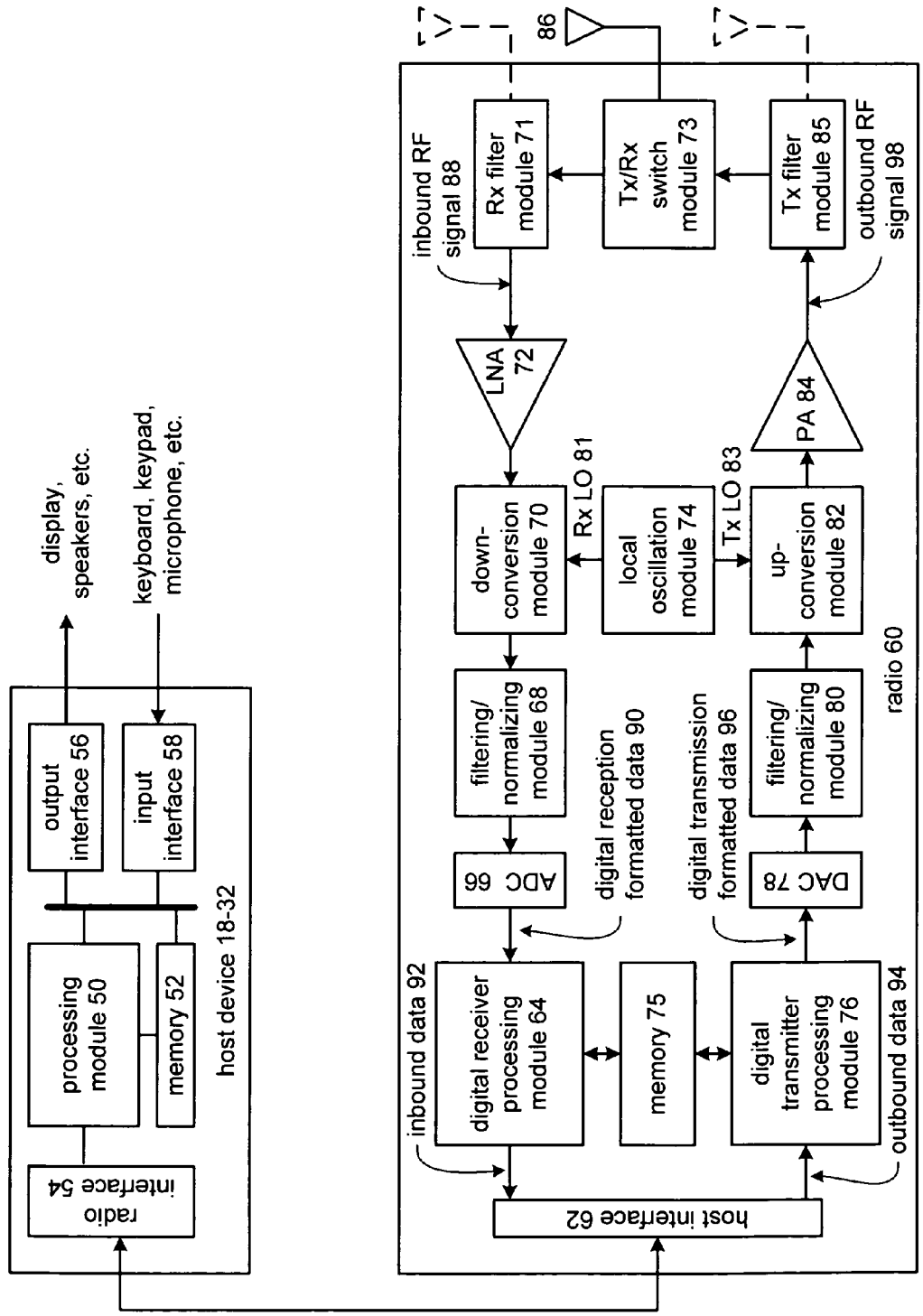
FIG. 2 is a schematic block diagram of a wireless communication system in accordance with the present invention.

FIG. 2 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, digital receiver processing module 64, an analog-to-digital converter 66, a filtering/normalizing module 68, an IF mixing down conversion stage 70, a receiver filter 71, a low noise amplifier 72, a transmitter/receiver switch 73, a local oscillation module 74, memory 75, a digital transmitter processing module 76, a digital-to-analog converter 78, a filtering/normalizing module 80, an IF mixing up conversion stage 82, a power amplifier 84, a transmitter filter module 85, and an antenna 86. The antenna 86 may be a single antenna that is shared by the transmit and receive paths as regulated by the Tx/Rx switch 73, or may include separate antennas for the transmit path and receive path. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11 Bluetooth, et cetera) to produce digital transmission formatted data 96. The digital transmission formatted data 96 will be a digital base-band signal or a digital low IF signal, where the low IF typically will be in the frequency range of one hundred kilohertz to a few megahertz.

The digital-to-analog converter 78 converts the digital transmission formatted data 96 from the digital domain to the analog domain. The filtering/normalizing module 80 filters and/or normalizes an orthogonal relationship of the analog signal prior to providing it to the IF mixing stage 82. The IF mixing stage 82 converts the analog baseband or low IF signal into an RF signal based on a transmitter local oscillation 83 provided by local oscillation module 74. The power amplifier 84 amplifies the RF signal to produce outbound RF signal 98, which is filtered by the transmitter filter module 85. The antenna 86 transmits the outbound RF signal 98 to a targeted device such as a base station, an access point and/or another wireless communication device.

The radio 60 also receives an inbound RF signal 88 via the antenna 86, which was transmitted by a base station, an access point, or another wireless communication device. The antenna 86 provides the inbound RF signal 88 to the receiver filter module 71 via the Tx/Rx switch 73, where the Rx filter 71 bandpass filters the inbound RF signal 88. The Rx filter 71 provides the filtered RF signal to low noise amplifier 72, which amplifies the signal 88 to produce an amplified inbound RF signal. The low noise amplifier 72 provides the amplified inbound RF signal to the IF mixing module 70, which directly converts the amplified inbound RF signal into an inbound low IF signal or baseband signal based on a receiver local oscillation 81 provided by local oscillation module 74. The down conversion module 70 provides the inbound low IF signal or baseband signal to the filtering/gain module 68. The filtering/normalizing module 68 filters and/or normalizes an orthogonal relationship of the inbound low IF signal or the inbound baseband signal to produce a filtered inbound signal.

The analog-to-digital converter 66 converts the filtered inbound signal from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by radio 60. The host interface 62 provides the recaptured inbound data 92 to the host device 18-32 via the radio interface 54.

As one of average skill in the art will appreciate, the wireless communication device of FIG. 2 may be implemented using one or more integrated circuits. For example, the host device may be implemented on one integrated circuit, the digital receiver processing module 64, the digital transmitter processing module 76 and memory 75 may be implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 50 and the digital receiver and transmitter processing module 64 and 76.

Figure 3:
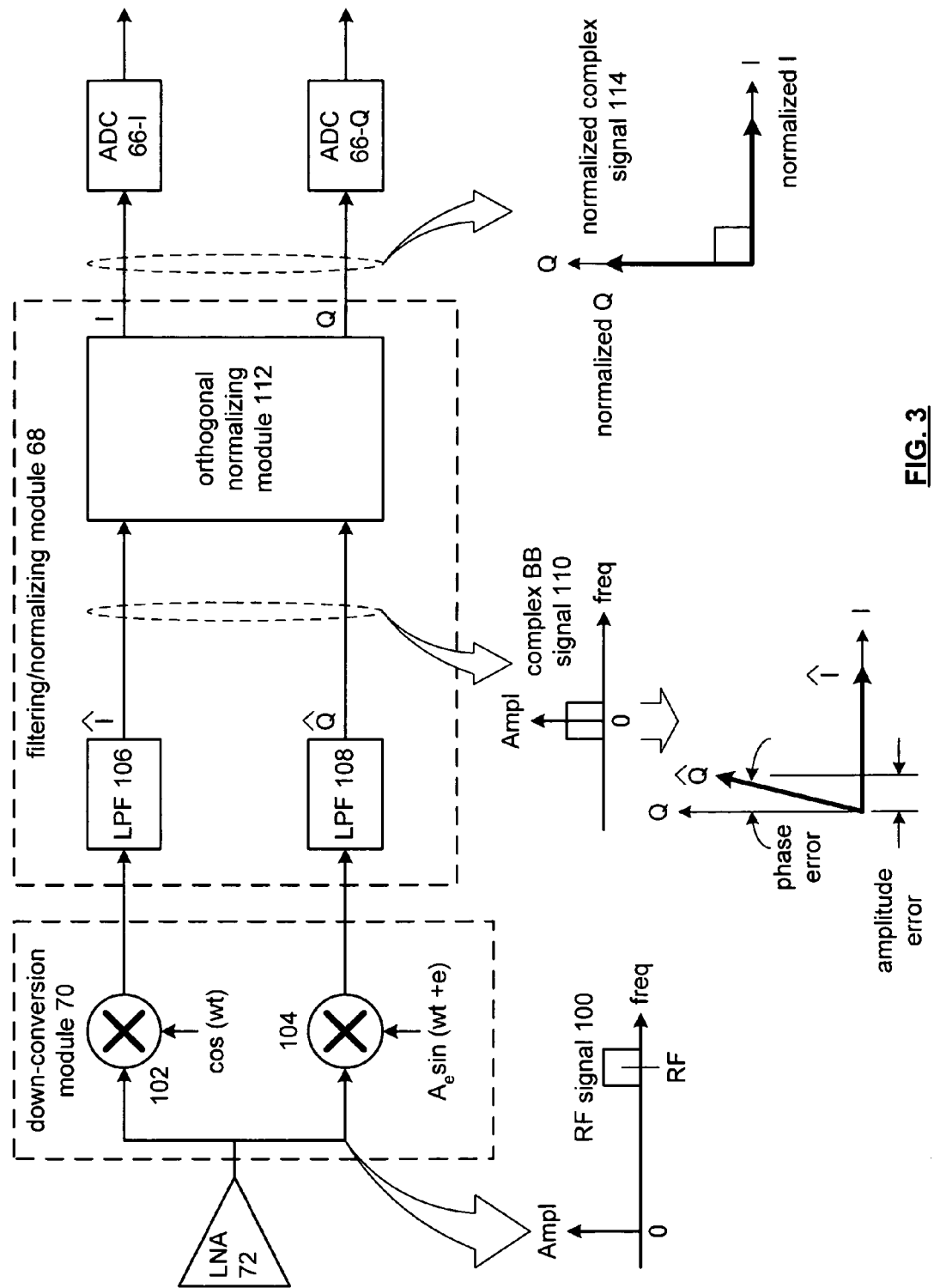
FIG. 3 is a schematic block diagram and functional diagram of a portion of the receiver section of the wireless communication device.

FIG. 3 is a schematic block diagram of a portion of the radio receiver including the low noise amplifier 72, the down-conversion module 70, the filter/normalizing module 68 and the analog-to-digital converter 66. The low noise amplifier 72 provides the received radio frequency signal to multipliers, or mixers, 102 and 104 of the down conversion module 70. As shown, the received RF signal 100 is centered at the RF frequency. The mixers 102 and 104 mix the received RF signal with a local oscillation that includes an in-phase component (e.g., $\cos(\omega t)$) and a quadrature component (e.g., $A_e \sin(\omega t + e)$). As shown, the quadrature component term includes an amplitude error term ($A_e$) and a phase error term (e). The amplitude and phase errors are introduced by the mismatches between the components of mixer 102 and 104 and mismatches of the circuitry to that produces the local oscillation.

The filtering/normalizing module 68 includes low pass filter 106, low pass filter 108 and an orthogonal normalizing module 112. Low pass filter 106 filters the baseband in-phase component produced by mixer 102 which is represented by $I\hat{\ }$. The low pass filter 108 filters the baseband quadrature component produced by mixer 104 to produce a quadrature component ($Q\hat{\ }$). The combination of the in-phase component and quadrature component comprise the complex baseband signal 110 that is centered at the baseband frequency, i.e., zero. In addition, due to the imperfections of mixers 102 and 104, the in-phase and quadrature components produced by low pass filters 106 and 108 are not exactly orthogonal (i.e., not exactly 90° phase shifted and not exactly of the same magnitude). This is further depicted in the IQ representation of the complex baseband signal 110 illustrating the phase-error and amplitude error.

The orthogonal normalizing module 112 effectively determines the corresponding phase and amplitude error, as will be discussed with respect to FIGS. 4-10, to normalize the orthogonal relationship between the in-phase component and quadrature component to produce a normalized complex signal 114. The normalized complex signal 114 includes a normalized in-phase component and a normalized quadrature component that have a substantially orthogonal relationship. A complex analog-to-digital converter 66-I and 66-Q convert the normalized in-phase component and normalized quadrature component to digital signals that are subsequently processed by the digital receiver processor 64 to recapture data 92.

Figure 4:
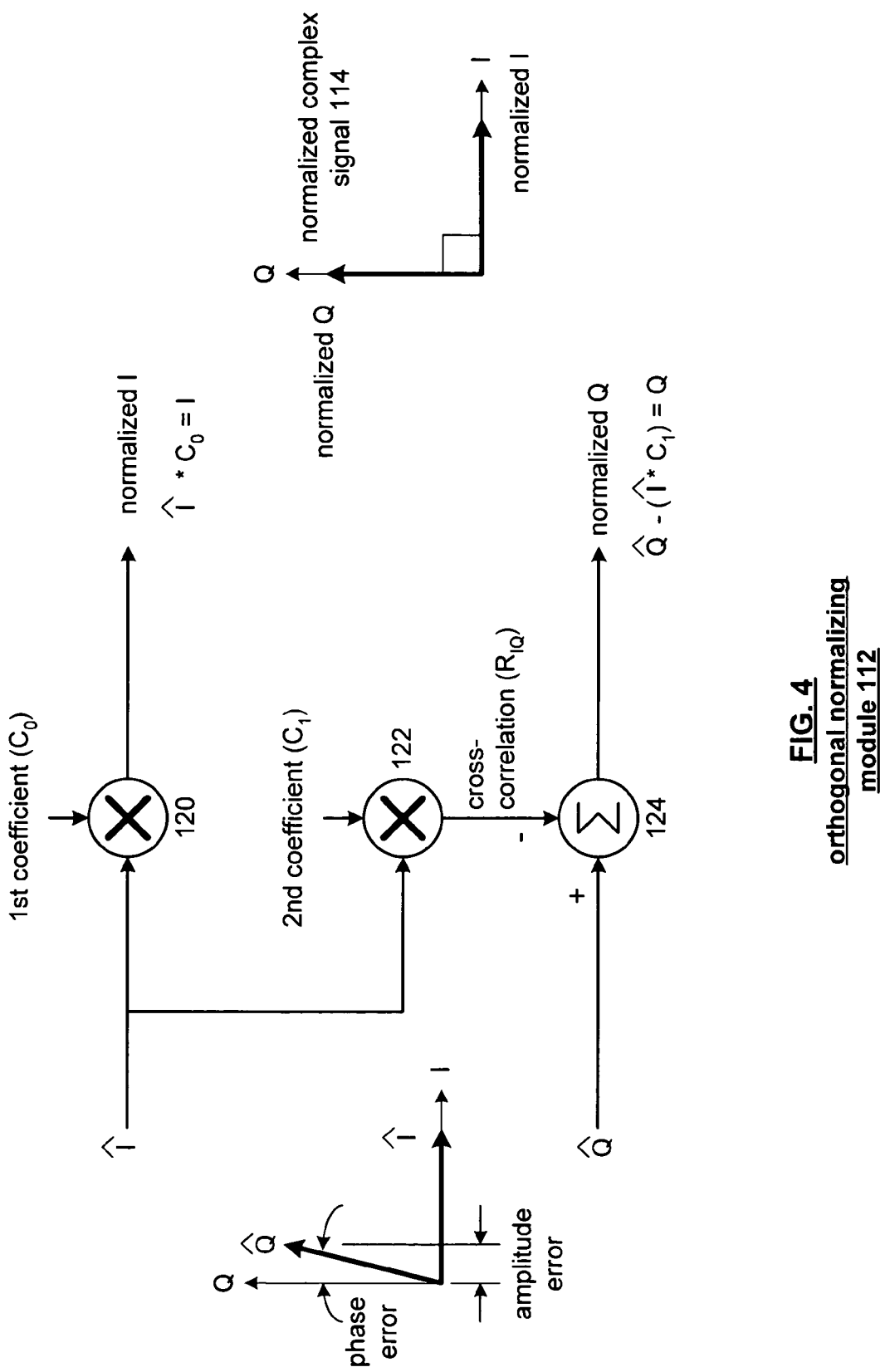
FIG. 4 is a schematic block diagram of an orthogonal normalizing module in accordance with the present invention.

FIG. 4 is a schematic block diagram of an embodiment of the orthogonal normalizing module 112 that includes a $1^{st}$ multiplier 120, a $2^{nd}$ multiplier 122 and a subtraction module 124. As shown, the $1^{st}$ multiplication module 120 multiplies the in-phase component with a $1^{st}$ coefficient ($C_0$) to produce the normalized in-phase component. The $2^{nd}$ multiplier 122 multiplies the in-phase component with a $2^{nd}$ coefficient ($C_1$) to produce a cross-correlation ($R_{IQ}$). The subtraction module 124 subtracts the cross-correlation from the quadrature component to produce the normalized quadrature component. The $1^{st}$ and $2^{nd}$ coefficients may be stored in programmable registers wherein the $1^{st}$ and $2^{nd}$ coefficients may be written into the register upon a manufacturing trial and error test or some other procedure to determine the $1^{st}$ and $2^{nd}$ coefficients. As shown in FIG. 4, the normalization performed by orthogonal normalizing module 112 is with respect to the in-phase component. However as one of average skill in the art will appreciate, the normalization may be done with respect to the quadrature component. As one of average skill in the art will further appreciate, the $1^{st}$ and $2^{nd}$ coefficients may be updated over time to compensate for temperature variations and/or aging variations of the components of the radio frequency integrated circuit.

Figure 5:
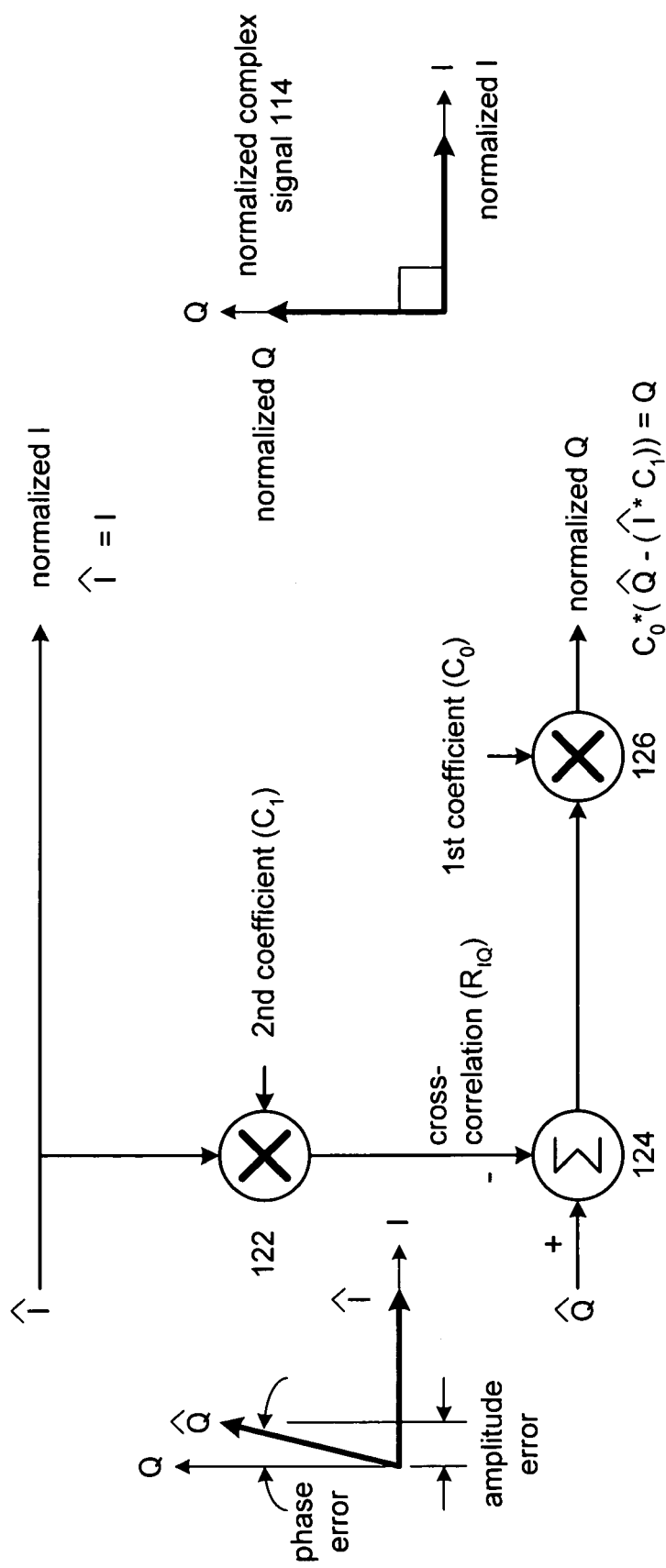
FIG. 5 is a schematic block diagram of an alternate orthogonal normalizing module in accordance with the present invention.

FIG. 5 is a schematic block diagram of an alternate embodiment of the orthogonal normalizing module 112 and includes a multiplier 122, the subtraction module 124, and another multiplier 126. In this embodiment, the in-phase component is passed as the normalized in-phase component. The multiplier 122 multiplies the in-phase component with the $2^{nd}$ coefficient ($C_1$) to produce the cross-correlation. Subtraction module 124 subtracts the cross-correlation from the quadrature component which is subsequently multiplied with the $1^{st}$ coefficient $C_0$ to produce the normalized quadrature component. In general, the $2^{nd}$ coefficient primarily corresponds to the amplitude error where the $1^{st}$ coefficient primarily corresponds to the phase error. However, both the phase and amplitude errors contribute to the determination of the $1^{st}$ and $2^{nd}$ coefficients, which will be subsequently described with reference to FIG. 8, FIG. 9 and FIG. 10 and is described in the patent application to which the present application is claiming priority.

Figure 6:
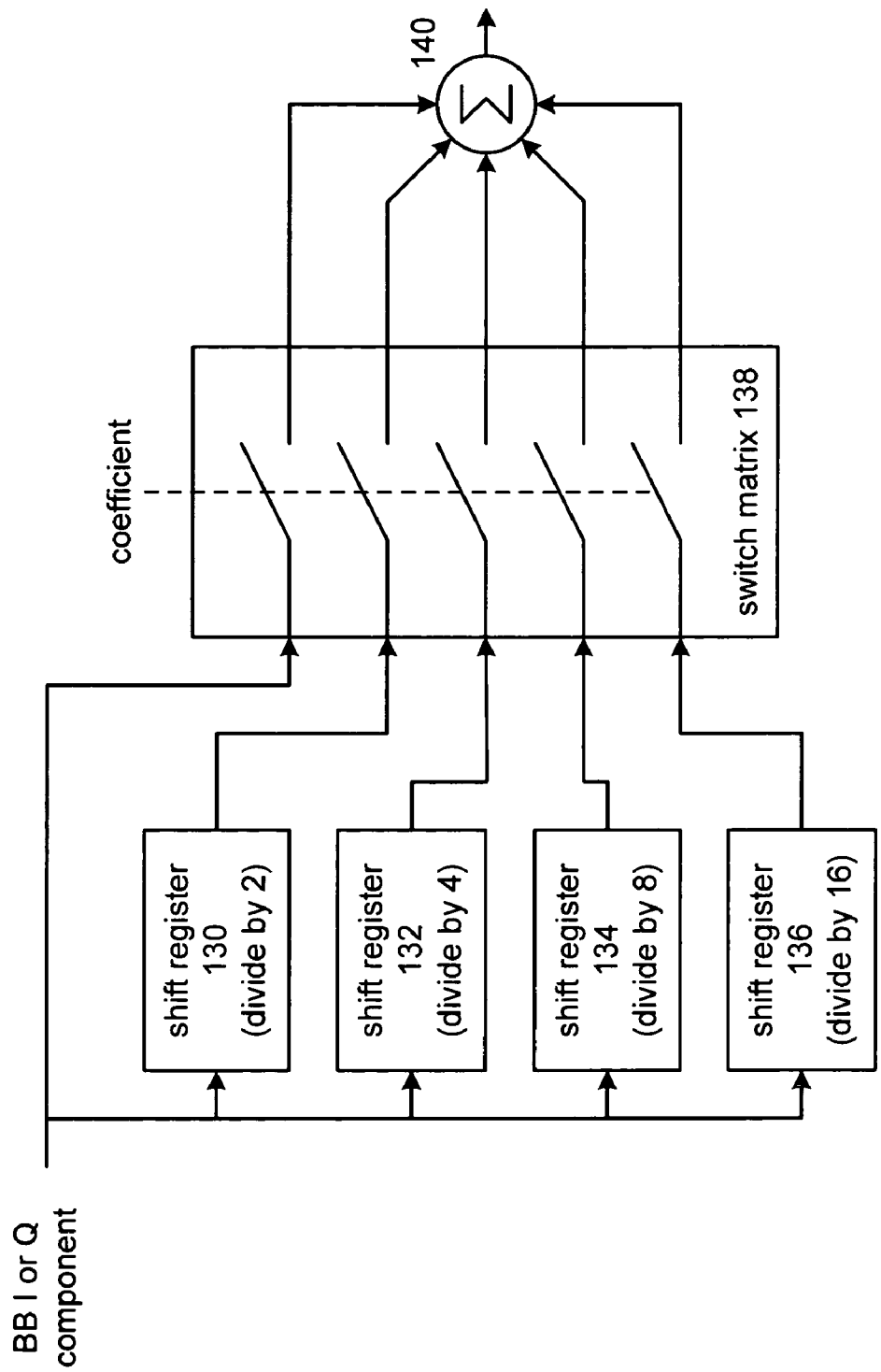
FIG. 6 is a schematic block diagram of a multiplier that may be used in either of the embodiments of the orthogonal normalizing module.

FIG. 6 is a schematic block diagram of multiplier 120, 122 or 126 as used in FIGS. 4 and 5. In this embodiment, the multiplier includes a plurality of shift registers 130-136, a switching matrix 138, and a summation module 140. Each of the shift registers 130 perform a shift right operation by 1, 2, 3 or 4-bits to produce a divide-by-2, divide-by-4, divide-by-8 and divide-by-16 representation of the baseband in-phase component or the baseband quadrature component. Based on the corresponding coefficient, the switch matrix 138 provides a combination of the undivided component with the divided components to the summation module 140, which sums the components to produce the multiplied representation. For instance, if the coefficient is 0.5, then the switch matrix 138 would pass the output of shift register 130 to the summation module as the only input of summation module 140 such that the resulting output is 0.5 of the corresponding in-phase or quadrature component. If, for example the coefficient is 0.75, the switch matrix 138 would provide the outputs of shift register 130 and 132 to summation module 140 which summed together provide 0.75 of the in-phase or quadrature components. As one of average skill in the art will appreciate, if the coefficient is fixed, switch matrix 138 may be omitted.

Figure 7:
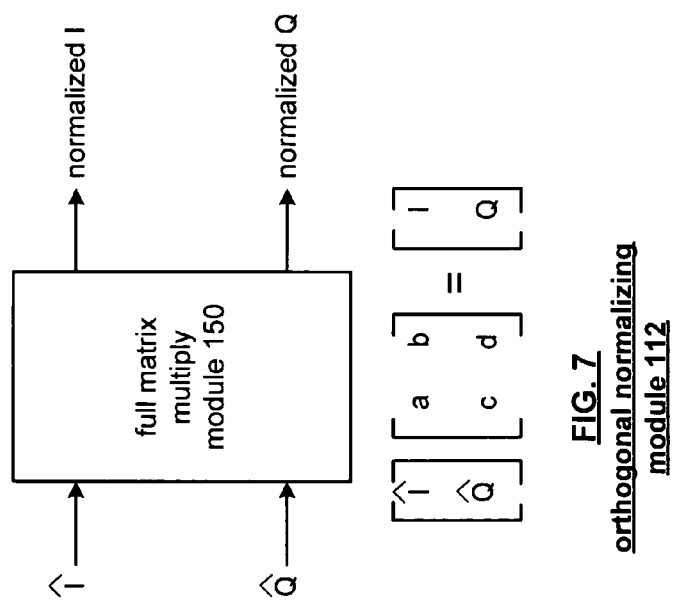
FIG. 7 is a schematic block diagram of another embodiment of an orthogonal normalizing module in accordance with the present invention.

FIG. 7 is a schematic block diagram of another embodiment of the orthogonal normalizing module 112. In this embodiment, the orthogonal normalizing module 112 includes a full matrix multiply module 150 that performs the illustrated matrix function of multiplying coefficients a, b, c, and d with the in-phase components and quadrature components to produce the normalized in-phase and quadrature components. In one embodiment, "a" may corresponds to the $1^{st}$ coefficient, "b" may be zero, "c" may correspond to the inverse of the $1^{st}$ coefficient, and "d" may be 1.

Figure 8:
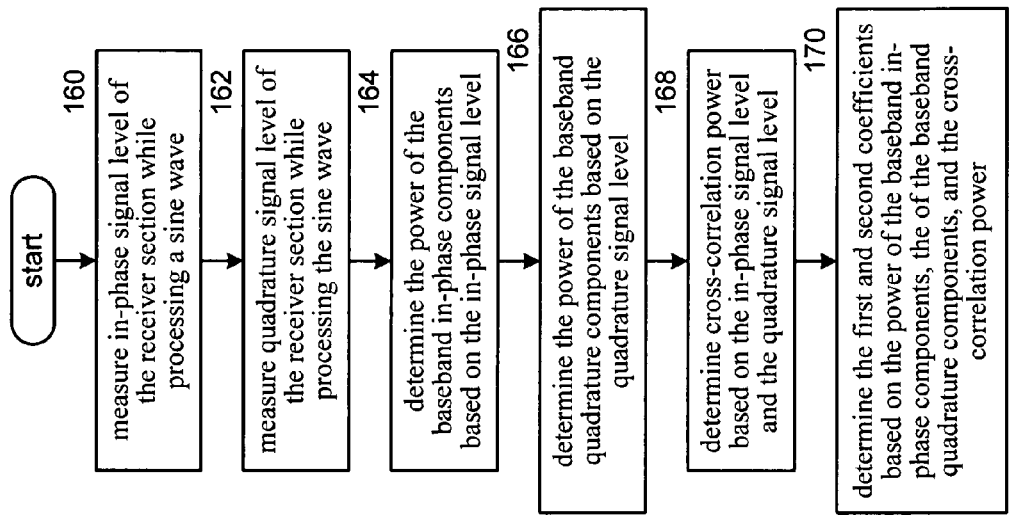
FIG. 8 is a logic diagram of a method for determining the $1^{st}$ and $2^{nd}$ coefficients used by the orthogonal normalizing module.

FIG. 8 is a logic diagram of a method for determining the $1^{st}$ and $2^{nd}$ coefficients. The processing begins at Step 160 where the receiver section measures the in-phase signal strength while processing a sine wave. The sine wave may be provided to the receiver section in a loop back mode, (i.e., the transmitter RF modulates a sine wave which is then fed to the low noise amplifier of the receiver) and or may be done by manufacturing test equipment, et cetera. The process then proceeds to Step 162 where the receiver section also measures the signal level of the quadrature components while processing the sine wave. The process then proceeds to Step 164 where the power level of the in-phase components is determined based on the in-phase signal components. For example, multiplying the amplitude of the in-phase signal component with itself produces the power.

The process then proceeds to Step 166 where the power of the baseband quadrature components are determined based on the quadrature signal level. Again, this may be done by multiplying the quadrature signal level, which corresponds to the magnitude of the quadrature signal, with itself to produce the power level. The process then proceeds to Step 168 where a cross-correlation power is determined based on the in-phase signal and the quadrature signal. This may be determined by squaring the in-phase signal level and subtracting the square of the quadrature signal level therefrom. The process then proceeds to Step 170 where the $1^{st}$ and $2^{nd}$ coefficients are determined based on the power of the baseband in-phase components, the power of the baseband quadrature components and the cross-correlation power. The determination of the $1^{st}$ and $2^{nd}$ coefficients from the in-phase power, quadrature power and cross-correlation power may be done as described in the parent case.

Figure 9:
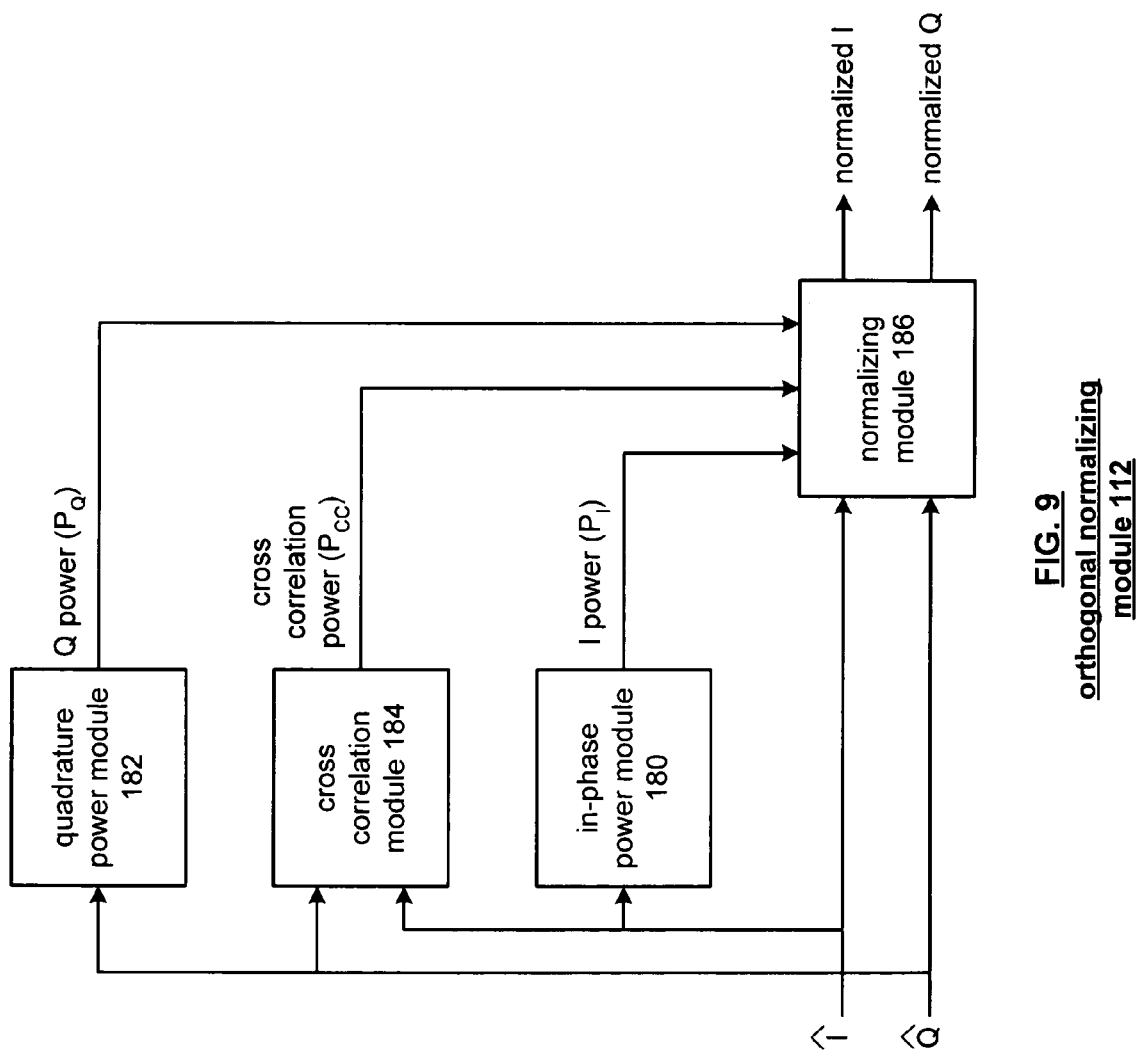
FIG. 9 is a schematic block diagram of yet another embodiment of an orthogonal normalizing module in accordance with the present invention.

FIG. 9 is a schematic block diagram of yet another embodiment of the orthogonal normalizing module 112. In this embodiment, the orthogonal normalizing module 112 includes a quadrature module 182, a cross-correlation module 184, an in-phase power module 180, and a normalizing module 186. The in-phase power module 180 is operably coupled to determine an in-phase power from the in-phase components. The quadrature power module 182 is operably coupled to determine a quadrature power from the quadrature components. The cross-correlation power module 184 is operably coupled to determine a cross-correlation power between the in-phase components and quadrature components. In one embodiment, the in-phase power module 180 may determine the in-phase power by squaring the magnitude of the in-phase components. Similarly, the quadrature power module may determine the quadrature power by squaring the magnitude of the quadrature components. The cross-correlation module 184 may determine the cross-correlation power by squaring the magnitudes of the in-phase components and quadrature components and then subtracting the squared quadrature components from the squared in-phase components.

The normalizing module 186 is operably coupled to convert the quadrature power, cross-correlation power, and in-phase power into $1^{st}$ and $2^{nd}$ coefficients. The normalizing module 186 then utilizes the $1^{st}$ and $2^{nd}$ coefficients to normalize the in-phase and quadrature components. The determination of the $1^{st}$ and $2^{nd}$ coefficients from the quadrature power, cross-correlation power and in-phase power may be derived as presented in the parent patent application.

Figure 10:
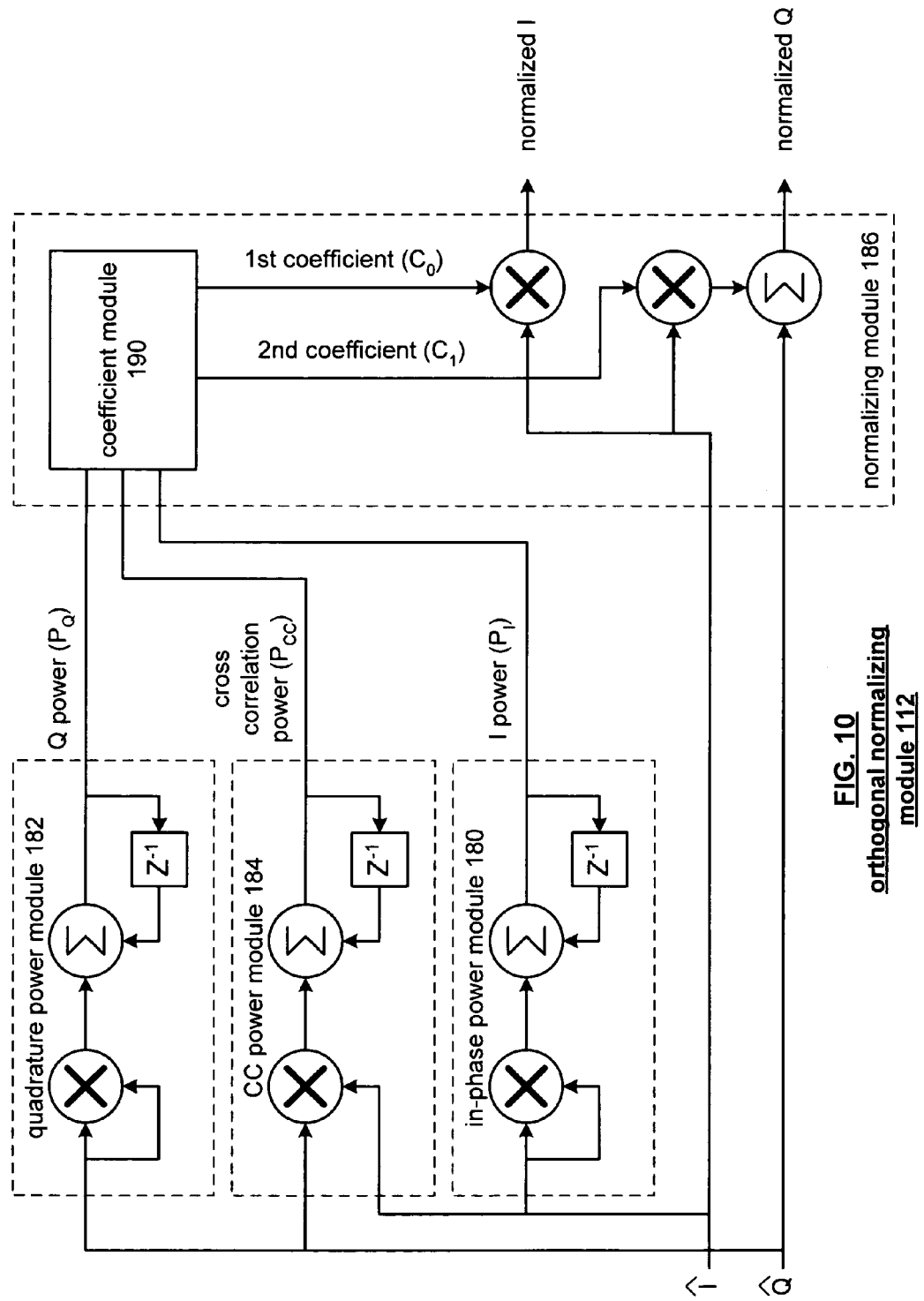
FIG. 10 is a schematic block diagram of a more detailed orthogonal normalizing module in accordance with the present invention.

FIG. 10 is a schematic block diagram of the orthogonal normalizing module 112 including the quadrature power module 182, the cross-correlation power module 184, the in-phase power module 180, and the normalizing module 186. Each of the power modules 180-184 includes a multiplier and an accumulator. The accumulator is represented by a summation module and a delay block ($Z^{-1}$). Accordingly, as illustrated, the quadrature power module 182 squares the quadrature components and then accumulates power level or time to produce the quadrature power. Similarly, the in-phase power module 180 squares the in-phase component and accumulates that value to produce the in-phase power component. The cross-correlation power module multiples the in-phase component and the quadrature component and then accumulates that value over time to produce the cross-correlation power level.

The normalizing module 186 includes a coefficient module 190, a pair of multipliers and a summation module. The coefficient module 190 determines the $1^{st}$ and $2^{nd}$ coefficients from the quadrature power, the cross-correlation power and the in-phase power. The $1^{st}$ multiplier multiplies the in-phase component with the $1^{st}$ coefficient to produce the normalized in-phase component. The $2^{nd}$ multiplier multiplies the in-phase component with the $2^{nd}$ coefficient to produce a cross-correlation. The summation module, subtracts the cross-correlation from the quadrature component to produce the normalized quadrature component. As an alternative, the normalizing module 186 may include the multipliers and summation module as illustrated in FIG. 5.

Figure 11:
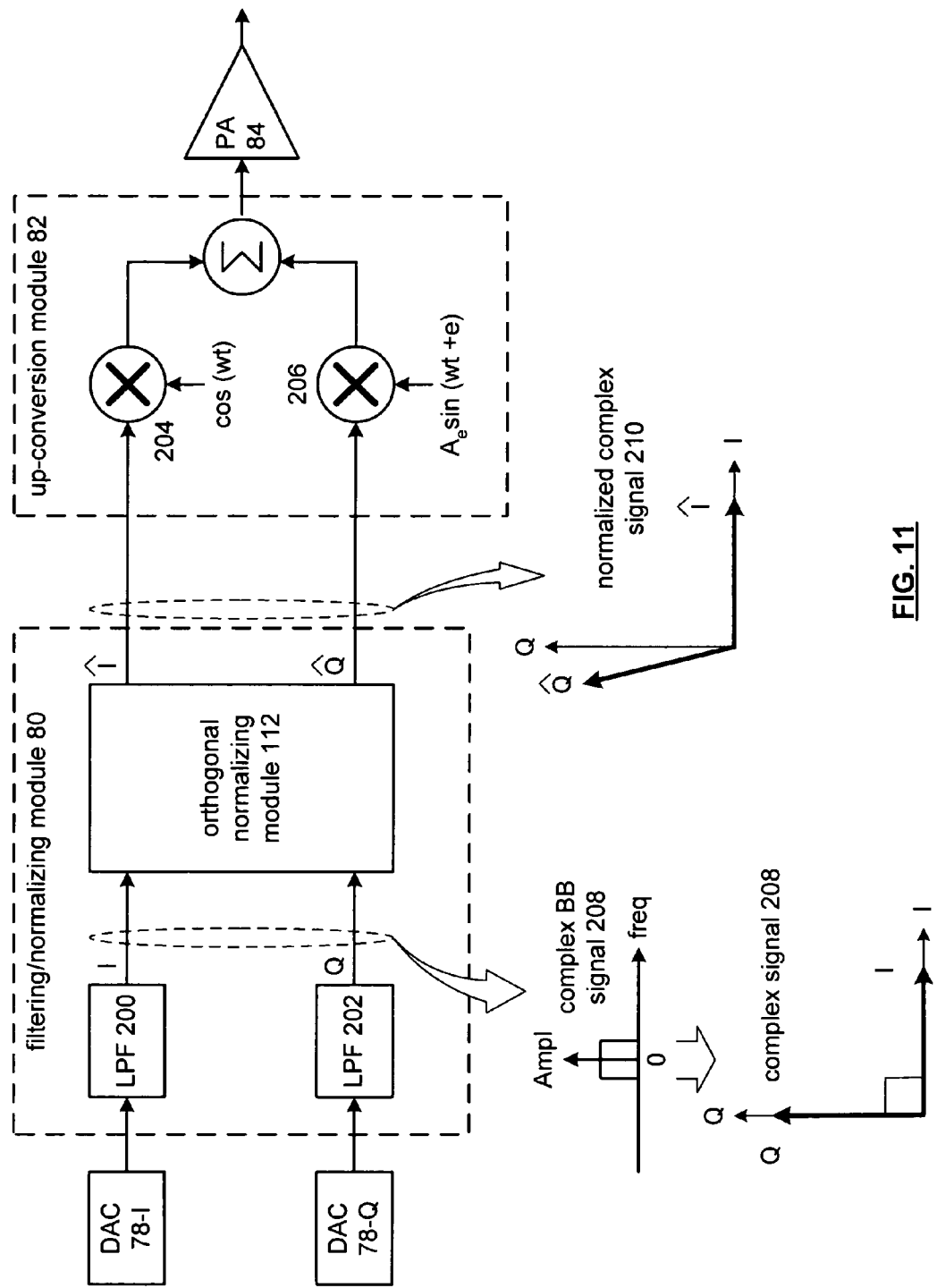
FIG. 11 is a schematic block diagram of a portion of the transmitter section in accordance with the present invention.

FIG. 11 illustrates a schematic block diagram of a portion of the transmitter section including the complex digital-to-analog converter 78-I and 78-Q, the filtering/normalizing module 80, the up-conversion module 82 and the power amplifier 84. The digital-to-analog converter 78-I and 78-Q are operably coupled to receive digital complex baseband signals and provide them to the filtering/normalizing module 80.

The filtering/normalizing module 80 includes two low pass filters 200 and 202 and the orthogonal normalizing module 112. In this instance, since the low pass filters are in the transmit section; the corresponding complex baseband signal 208 includes the in-phase and quadrature components that are in the desired orthogonal relationship as shown. However, once the complex baseband signal 108 is up-converted by mixing with in-phase and quadrature components of a local oscillation, the orthogonal relationship between the in-phase and quadrature components will be less than desired. In the transmitter section, the orthogonal normalizing module 112 provides pre-correction for the orthogonal relationship such that the resulting normalized complex signal 210 introduces a phase error and/or amplitude error that when processed via the up-conversion module 82 will result in a substantially orthogonal relationship at RF frequencies.

The up-conversion module 82 includes mixer 204, mixer 206 and a summation module. In operation, each of the mixers multiplies the corresponding components with an in-phase or quadrature component of the local oscillation. The resulting outputs of mixers 204 and 206 are summed together and subsequently provided through a bandpass filter (not shown) and provided to the power amplifier.

Figure 12:
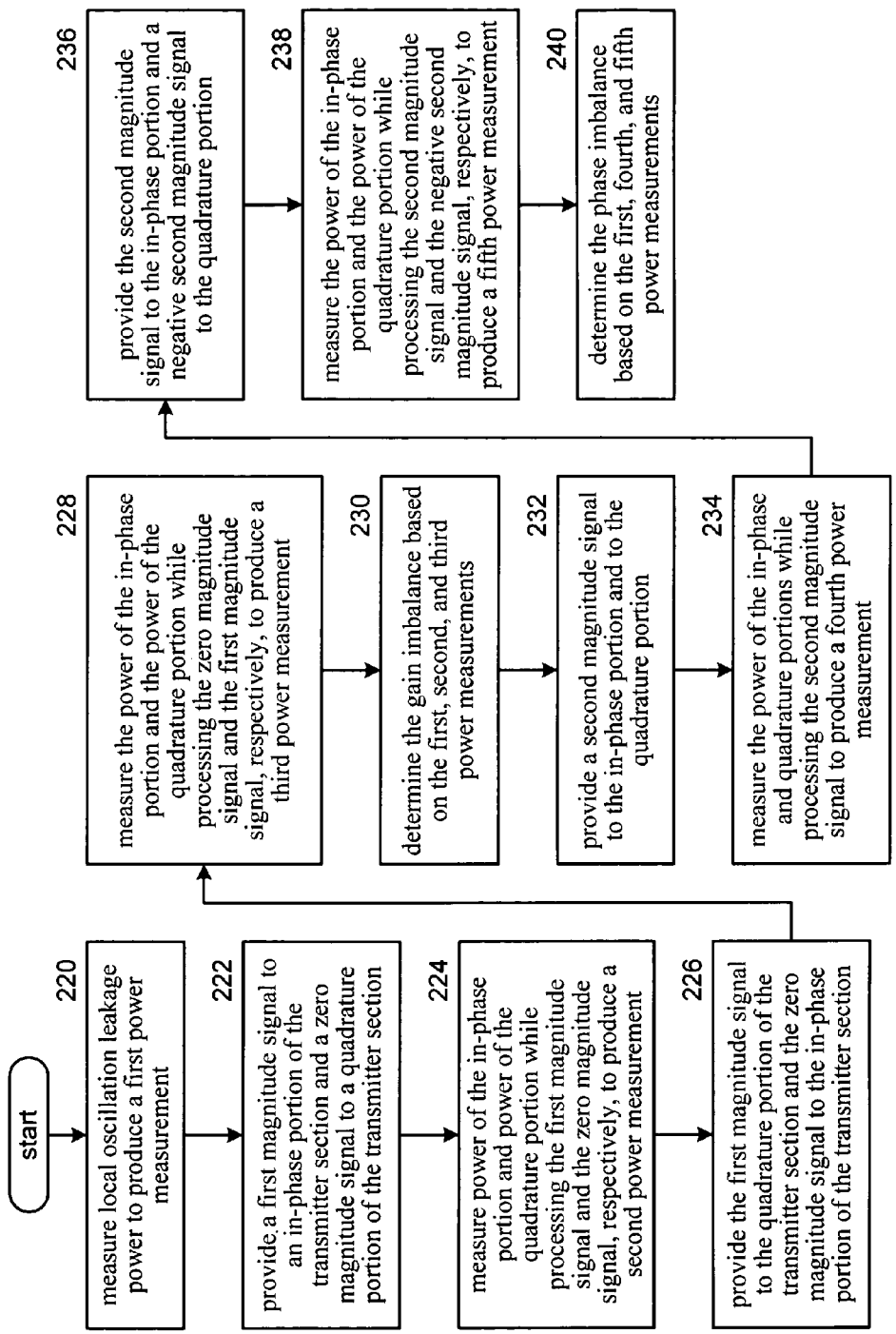
FIG. 12 is a logic diagram of a method for determining phase imbalance and gain imbalance to subsequently produce the $1^{st}$ and $2^{nd}$ coefficients used by the orthogonal normalizing module.

In the transmit section, the $1^{st}$ and $2^{nd}$ coefficients used by the orthogonal normalizing module 112 may be generated based on a phase imbalance and a gain imbalance. The method of FIG. 12 illustrates the process for determining the gain imbalance and phase imbalance. The process begins at Step 220 where local oscillation leakage power is measured to produce a $1^{st}$ power measurement. The process then proceeds to Step 222 where a $1^{st}$ magnitude signal is provided to an in-phase portion of the transmitter section and a zero magnitude signal is provided to a quadrature portion of the transmitter section. The process then proceeds to Step 224 where the power of the in-phase portion and the power of the quadrature portion is measured while processing the $1^{st}$ magnitude signal and the zero magnitude signal, respectively to produce a $2^{nd}$ power measurement.

The process then proceeds to Step 226 where the $1^{st}$ magnitude signal is provided to the quadrature component of the transmitter section and the zero magnitude signal is provided to the in-phase portion of the transmitter section. The process then proceeds to Step 228 where the power of the in-phase portion and the power of the quadrature portion is measured while processing the zero magnitude signal and the $1^{st}$ magnitude signal, respectively to produce a $3^{rd}$ power measurement. The process then proceeds to Step 230 where the gain imbalance is determined based on the $1^{st}$, $2^{nd}$ and $3^{rd}$ power measurements.

The process then proceeds to Step 232 where a $2^{nd}$ magnitude signal is provided to the in-phase portion and to the quadrature portion of the transmitter. The process then proceeds to Step 234 where the power of the in-phase and quadrature components are measured while processing the $2^{nd}$ magnitude signal to produce a $4^{th}$ power measurement. The process then proceeds to Step 236 where the $2^{nd}$ magnitude signal is provided to the in-phase portion and a negative $2^{nd}$ magnitude signal is provided to the quadrature portion. The process then proceeds to Step 238 where the power of the in-phase portion and the power of the quadrature portion are measured while processing the $2^{nd}$ magnitude signal and the negative $2^{nd}$ magnitude signal, respectively, to produce a $5^{th}$ power measurement. The process then proceeds to Step 240 where the phase imbalance is determined based on the $1^{st}$, $4^{th}$ and $5^{th}$ power measurements. For instance, the gain and phase imbalance may be determined in accordance with the following:

$x(t)=x_I(t)*\cos(\omega_c t)-x_Q(t)*\sin(\omega_c t)$, with no phase or gain imbalance;

$xP(t)=x_I(t)*\cos(\omega_c t)-x_Q(t)*\sin(\omega_c t+\theta)$, where $\theta$ corresponds to phase error $xG(t)=x_I(t)*\cos(\omega_c t)-G*x_Q(t)*\sin(\omega_c t)$, where G corresponds to amplitude error For phase imbalance:

$xP(t)=x_I(t)*\cos(\omega_c t)-x_Q(t)*[\cos(\theta)*\sin(\omega_c t)+\sin(\theta)*\cos(\omega_c t)]$ With $[x_I(t), x_Q(t)]=[A,0]$ $xP(t)=A*\cos(\omega_c t)$ and $P1=A^2/2$ With $[x_I(t), x_Q(t)]=[0,A]$ $xP(t)=-A*[\cos(\theta)*\sin(\omega_c t)+\sin(\theta)*\cos(\omega_c t)]$ and $P2=A^2/2$ With $[x_I(t), x_Q(t)]=[A/sqrt(2), A/sqrt(2)]$ $xP(t)=A/sqrt(2)*[1-\sin(\theta)]*\cos(\omega_c t)-A/sqrt(2)*\cos(\theta)*\sin(\omega_c t)$ and $P3=(A[[1-\sin(\theta)])^2/4+(A*\cos(\theta))^2/4=A^2/2[1-\sin(\theta)]$ With $[x_I(t), x_Q(t)]=[A/sqrt(2), -A/sqrt(2)]$ $xP(t)=A/sqrt(2)*[1+\sin(\theta)]*\cos(\omega_c t)+A/sqrt(2)*\cos(\theta)*\sin(\omega_c t)$ and $P4=(A[[1+\sin(\theta)])^2/4+(A*\cos(\theta))^2/4=A^2/2[1+\sin(\theta)]$ For gain imbalance:

$xG(t)=x_I(t)*\cos(\omega_c t)-G*x_Q(t)*\sin(\omega_c t)$

With $[x_I(t), x_Q(t)]=[A,0]$ $xG(t)=A*\cos(\omega_c t)$ and $P1=A^2/2$

With $[x_I(t), x_Q(t)]=[0,A]$ $xG(t)=-A*G*\sin(\omega_c t)$ and $P2=(A*G)^2/2$

Figure 13:
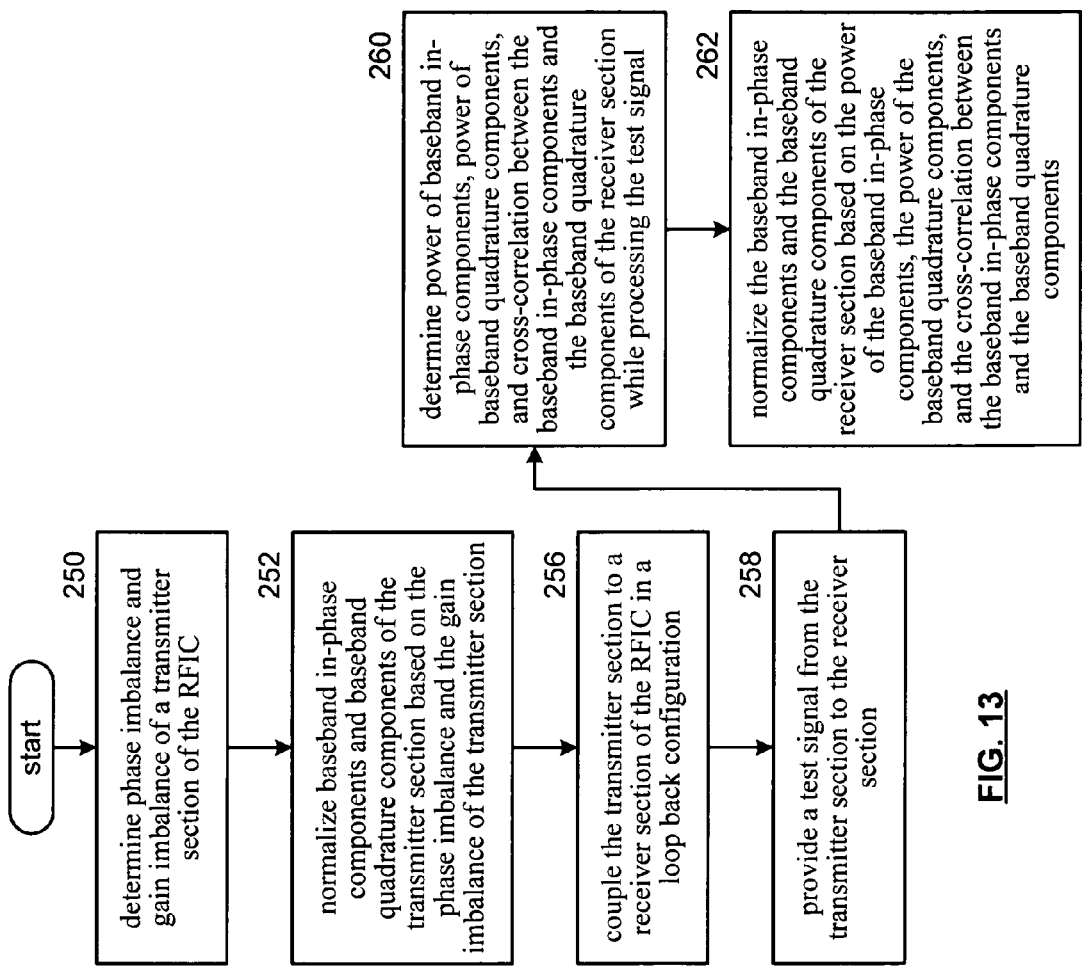
FIG. 13 is a logic diagram of a method for orthogonal normalization of a radio frequency integrated circuit in accordance with the present invention.

With $[x_I(t), x_Q(t)]=[A/sqrt(2), A/sqrt(2)]$ $xG(t)=A/sqrt(2)*\cos(\omega_c t)-A/sqrt(2)*\sin(\omega_c t)$ and $P3=A^2*(1+G^2)/2$ With $[x_I(t), x_Q(t)]=[A/sqrt(2), -A/sqrt(2)]$ $xG(t)=A/sqrt(2)*\cos(\omega_c t)+A/sqrt(2)*\sin(\omega_c t)$ and $P4=A^2*(1+G^2)/2$ FIG. 13 is a method for orthogonal normalization within a radio frequency integrated circuit. The process begins at Step 250 where a phase imbalance and gain imbalance of a transmitter section of the radio frequency integrated circuit (RFIC) is determined. This may be done as was described with reference to FIG. 12. The process then proceeds to Step 252 where the baseband in-phase components and baseband quadrature components of the transmitter section are normalized based on the phase imbalance and gain imbalance of the transmitter section. This may be done as described with reference to FIG. 11. The process then proceeds to Step 256 where the transmitter section is coupled to the receiver section in a loop back configuration. With reference to FIG. 2, loop back configuration is obtained by enabling the T/R switch module 73 to pass the outbound RF signals 98 to the RX filter module 71.

The process then proceeds to Step 258 where the transmitter section provides a test signal to the receiver. The test signal may be generated at baseband and up-converted to produce a RF sine wave that is provided via the T/R switch to the receiver section. The process then proceeds to Step 260 where power of the baseband in-phase components, power of the baseband quadrature components and cross-correlation between the in-phase components and baseband quadrature components of the receiver section are determined while processing the test signal. This may be done as described with reference to FIGS. 8-10. The process then proceeds to Step 262 where the baseband in-phase components and baseband quadrature components are normalized based on the power of the baseband in-phase components, the power of the baseband quadrature components and the cross-correlation between the baseband in-phase components and the baseband quadrature components. This may be done as previously described with reference to FIGS. 3-7.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented various embodiments for orthogonal normalization within a transmitter and/or receiver section of a radio frequency integrated circuit. By improving the orthogonal relationship of in-phase and quadrature components within a radio frequency integrated circuit, efficiency of the radio frequency integrated circuit is improved. As one of average skill in the art will appreciate, other embodiments may be derived from the teaching of the present invention without deviating from the scope of the claims.

What is claimed is:

1. A radio frequency integrated circuit (RFIC) comprises:
    transmitter section operably coupled to convert outbound baseband signals into outbound radio frequency (RF) signals;
    receiver section operably coupled to convert inbound RF signals into inbound baseband signals, wherein the receiver section includes: a low noise amplifier operably coupled to amplify the inbound RF signals to produce amplified inbound RF signals;
    down-conversion module operably coupled to convert the amplified inbound RF signals into baseband in-phase components and quadrature components;
    orthogonal-normalizing module operably coupled to:
        obtain a first coefficient that is based on at least one of power of the baseband in-phase components, power of the baseband quadrature components, and cross-correlation between the baseband in-phase components and the baseband quadrature components;
        obtain a second coefficient that is based on at least one of the power of the baseband in-phase components, the power of the baseband quadrature components, and the cross-correlation between the baseband in-phase components and the baseband quadrature components;
        normalize an orthogonal relationship between the baseband in-phase components and the baseband quadrature components based on the first coefficient and the second coefficient to produce normalized in-phase components and normalized quadrature components; and
    baseband processor operably coupled to recapture data from the normalized in-phase and quadrature components.

2. The RFIC of claim 1, wherein the orthogonal-normalizing module comprises:
    a first multiplier module operably coupled to multiple the baseband in-phase components with the first coefficient to produce the normalized in-phase components;
    a second multiplier module operably coupled to multiple the baseband in-phase components with the second coefficient to produce the cross-correlation; and
    a subtraction module operably coupled to subtract the cross-correlation from the baseband quadrature components to produce the normalized quadrature components.

3. The RFIC of claim 2, wherein the first multiplier module comprises:
    a first plurality of shift registers operably coupled to produce a plurality of shifted representations of the baseband in-phase components;
    switch matrix operably coupled to pass selected ones of the plurality of shifted representations of the baseband in-phase components and the baseband in-phase components based on the first coefficient; and
    an adder operably coupled to add the selected ones of the plurality of shifted representations of the baseband in-phase components and the baseband in-phase components to produce the normalized in-phase components.

4. The RFIC of claim 2, wherein the second multiplier module comprises:
    a first plurality of shift registers operably coupled to produce a plurality of shifted representations of the baseband in-phase components;
    switch matrix operably coupled to pass selected ones of the plurality of shifted representations of the baseband in-phase components based on the second coefficient; and
    an adder operably coupled to add the selected ones of the plurality of shifted representations of the baseband in-phase components to produce the cross-correlation.

5. The RFIC of claim 1, wherein the orthogonal-normalizing module comprises:
    a first multiplier module operably coupled to multiply the baseband in-phase components with the second coefficient to produce the cross-correlation;
    a subtraction module operably coupled to subtract the cross-correlation from the baseband quadrature components to produce phase adjusted quadrature components; and
    a second multiplier module operably coupled to multiply the phase adjusted quadrature components with the first coefficient to produce the normalized quadrature components, wherein the baseband in-phase components are passed as the normalized in-phase components.

6. The RFIC of claim 1, wherein the orthogonal-normalizing module comprises:
a first programmable register for storing the first coefficient; and
a second programmable register for storing the second coefficient, wherein the first and second coefficients are determnined by a trial and error manufacturing test.

7. The RFIC of claim 1, wherein the orthogonal-normalizing module comprises:
a full matrix multiply module operably coupled to multiply the baseband in-phase components and the baseband quadrature components with a coefficient matrix that includes the first and second coefficients to produce the normalized in-phase components and the normalized quadrature components.

8. The RFIC of claim 1, wherein the orthogonal-normalizing module further functions to:
measure local oscillation leakage power to produce a first power measurement;
provide a first magnitude signal to an in-phase portion of the receiver section and a zero magnitude signal to a quadrature portion of the receiver section;
measure power of the in-phase portion and power of the quadrature portion while processing the first magnitude signal and the zero magnitude signal, respectively, to produce a second power measurement;
provide the first magnitude signal to the quadrature portion of the receiver section and the zero magnitude signal to the in-phase portion of the receiver section;
measure the power of the in-phase portion and the power of the quadrature portion while processing the zero magnitude signal and the first magnitude signal, respectively, to produce a third power measurement;
determine a gain imbalance based on the first, second, and third power measurements;
provide a second magnitude signal to the in-phase portion and to the quadrature portion;
measure the power of the in-phase and quadrature portions while processing the second magnitude signal to produce a fourth power measurement;
provide the second magnitude signal to the in-phase portion and a negative second magnitude signal to the quadrature portion;
measure the power of the in-phase portion and the power of the quadrature portion while processing the second magnitude signal and the negative second magnitude signal, respectively, to produce a fifth power measurement; and
determine a phase imbalance based on the first, fourth, and fifth power measurements, wherein the gain imbalance and the phase imbalance correspond to the power of the baseband in-phase components, the power of the baseband quadrature components, and the cross-correlation between the baseband in-phase components and the baseband quadrature components to detennine the first and second coefficients.

9. The RFIC of claim 1, wherein the orthogonal-normalizing module further functions to obtain the first and second coefficients by:
measuring in-phase signal level of the receiver section while processing a sine wave;
measuring quadrature signal level of the receiver section while processing the sine wave;
determining the power of the baseband in-phase components based on the in-phase signal level;
determining the power of the baseband quadrature components based on the quadrature signal level;
determining cross-correlation power based on the in-phase signal level and the quadrature signal level; and
determining the first and second coefficients based on the power of the baseband in-phase components, the of the baseband quadrature components, and the cross-correlation power.

10. The RFIC of claim 1, wherein the orthogonal-normalizing module normalizes the orthogonal relationship between the baseband in-phase components and the baseband quadrature components by:
selecting one of the baseband in-phase components and the baseband quadrature components as a reference component; and
normalizing another one of the baseband in-phase components and the baseband quadrature components to the reference component.

11. The RFIC of claim 1, wherein the orthogonal-normalizing module further functions to: update the first and second coefficients to compensate for at least one of temperature variation and aging.

12. A radio frequency integrated circuit (RFIC) comprises:
receiver section operably coupled to convert inbound radio frequency (RF) signals into inbound baseband signals;
transmitter section operably coupled to convert outbound data into outbound RF signals, wherein the transmitter section includes:
baseband processor operably coupled to convert the outbound data into the baseband in-phase components and baseband quadrature components;
orthogonal-normalizing module operably coupled to:
obtain a first coefficient that is based on at least one of a gain imbalance and phase imbalance;
obtain a second coefficient that is based on at least one of the gain imbalance and the phase imbalance;
normalize an orthogonal relationship between the baseband in-phase components and the baseband quadrature components based on the first coefficient and the second coefficient to produce normalized in-phase components and normalized quadrature components;
up-conversion module operably coupled to convert the normalized in-phase components and normalized quadrature components into RF signals; and power amplifier operably coupled to amplify the RF signals to produce the outbound RF signals.

13. The RFIC of claim 12, wherein the second multiplier module comprises:
a first plurality of shift registers operably coupled to produce a plurality of shifted representations of the baseband in-phase components;
switch matrix operably coupled to pass selected ones of the plurality of shifted representations of the baseband in-phase components based on the second coefficient; and
an adder operably coupled to add the selected ones of the plurality of shifted representations of the baseband in-phase components to produce the cross coupled in-phase components.

14. The RFIC of claim 12, wherein the orthogonal-normalizing module further functions to:
measure local oscillation leakage power to produce a first power measurement;

provide a first magnitude signal to an in-phase portion of the transmitter section and a zero magnitude signal to a quadrature portion of the transmitter section;

measure power of the in-phase portion and power of the quadrature portion while processing the first magnitude signal and the zero magnitude signal, respectively, to produce a second power measurement;

provide the first magnitude signal to the quadrature portion of the transmitter section and the zero magnitude signal to the in-phase portion of the transmitter section;

measure the power of the in-phase portion and the power of the quadrature portion while processing the zero magnitude signal and the first magnitude signal, respectively, to produce a third power measurement;

determine the gain imbalance based on the first, second, and third power measurements;

provide a second magnitude signal to the in-phase portion and to the quadrature portion;

measure the power of the in-phase and quadrature portions while processing the second magnitude signal to produce a fourth power measurement;

provide the second magnitude signal to the in-phase portion and a negative second magnitude signal to the quadrature portion;

measure the power of the in-phase portion and the power of the quadrature portion while processing the second magnitude signal and the negative second magnitude signal, respectively, to produce a fifth power measurement; and determine the phase imbalance based on the first, fourth, and fifth power measurements.

15. The RFIC of claim 12, wherein the orthogonal-normalizing module normalizes the orthogonal relationship between the baseband in-phase components and the baseband quadrature components by:

selecting one of the baseband in-phase components and the baseband quadrature components as a reference component; and normalizing another one of the baseband in-phase components and the baseband quadrature components to the reference component.

16. The RFIC of claim 12, wherein the orthogonal-normalizing module further functions to:

update the first and second coefficients to compensate for at least one of temperature variation and aging.

\* \* \* \* \*